(12) United States Patent
Hagstrom et al.

(10) Patent No.: US 6,302,601 B1
(45) Date of Patent: Oct. 16, 2001

(54) SUBSTRATE CARRIER AND PRINTHEAD MOUNTING FOR PRINTER

(75) Inventors: Erick Hagstrom, Hamel; Mark D. Strobel, Orono, both of MN (US)

(73) Assignee: Primera Technology, Inc., Plymouth, MN (US)

( * ) Notice: Subject to any disclaimer, the term of this patent is extended or adjusted under 35 U.S.C. 154(b) by 0 days.

(21) Appl. No.: 09/439,914

(22) Filed: Nov. 12, 1999

Related U.S. Application Data

(63) Continuation-in-part of application No. 09/326,041, filed on Jun. 4, 1999, now Pat. No. 6,148,722.
(60) Provisional application No. 60/088,397, filed on Jun. 8, 1998.

(51) Int. Cl.$^7$ .............................. B41J 19/00; B41F 17/00
(52) U.S. Cl. ............................. 400/283; 400/208; 101/35
(58) Field of Search .................................. 101/35, 36, 37, 101/44, 483; 400/283, 208, 56, 58, 682, 693

(56) References Cited

U.S. PATENT DOCUMENTS

| | | | |
|---|---|---|---|
| 2,084,319 | * 6/1937 | Charnock | 101/35 |
| 4,118,264 | * 10/1978 | Boettcher | 101/35 |
| 4,577,200 | 3/1986 | Rix et al. | 346/140 |
| 4,759,282 | * 7/1988 | Talmadge | 101/35 |
| 4,924,242 | * 5/1990 | Fukawa | 400/208 |
| 4,943,814 | 7/1990 | Otto | 400/58 |
| 5,020,926 | 6/1991 | Wilhelm | 400/682 |
| 5,078,518 | 1/1992 | Ono et al. | 400/103 |
| 5,117,241 | 5/1992 | Stephenson | 346/1.1 |
| 5,128,763 | * 7/1992 | Sakuragi | 400/208 |
| 5,248,207 | * 9/1993 | Yamamoto et al. | 400/208 |
| 5,316,395 | 5/1994 | Imai | 400/56 |
| 5,317,337 | 5/1994 | Ewaldt | 346/1.1 |
| 5,319,392 | 6/1994 | Durst et al. | 346/76 PH |
| 5,326,179 | 7/1994 | Fukai et al. | 400/120 |
| 5,355,357 | 10/1994 | Yamamori et al. | 400/682 |
| 5,369,422 | 11/1994 | Yoshida et al. | 347/215 |
| 5,374,944 | 12/1994 | Janosky et al. | 346/76 PH |
| 5,427,029 | 6/1995 | Dumke | 101/484 |
| 5,450,102 | 9/1995 | Ishida et al. | 349/136 |
| 5,462,374 | * 10/1995 | Kohno | 101/44 |
| 5,488,223 | 1/1996 | Austin et al. | 347/193 |
| 5,504,688 | 4/1996 | Letduaneau | 101/4 |
| 5,518,325 | 5/1996 | Kahle | 400/70 |

(List continued on next page.)

FOREIGN PATENT DOCUMENTS

| | | |
|---|---|---|
| 197 50 570 A1 | 6/1998 | (DE) . |
| 0 297 668 A2 | 1/1989 | (EP) . |
| 0 422 927 | 4/1991 | (EP) . |
| 0 430 565 A2 | 6/1991 | (EP) . |
| 0 799 710 A1 | 10/1997 | (EP) . |
| 2 715 102 | 1/1994 | (FR) . |
| 2 320 912 | 7/1998 | (GB) . |
| 55 164 180 | 12/1980 | (JP) . |
| 62 080 075 | 4/1987 | (JP) . |
| 10 157 176 | 6/1998 | (JP) . |

*Primary Examiner*—Eugene Eickholt
(74) *Attorney, Agent, or Firm*—Westman, Champlin & Kelly, P.A.

(57) ABSTRACT

A printer has a substrate carrier that is a planar membrane driven through the printer solely by friction drives. The planar membrane is completely removable from the printer, and can be adapted to support a substrate of desired configuration and held against locating surfaces while it is being driven through the printer by the friction drive. The friction drive comprises at least one set of rollers including a drive roller on one side of the carrier and a resiliently mounted roller on the other, and also includes a rotating resilient platen that is resiliently urged against a printhead for providing a reaction force for the friction drive while printing occurs.

23 Claims, 14 Drawing Sheets

U.S. PATENT DOCUMENTS

| | | | |
|---|---|---|---|
| 5,519,427 | 5/1996 | Cavaero et al. | 347/214 |
| 5,542,768 | 8/1996 | Rother et al. | 400/120.16 |
| 5,612,727 | 3/1997 | Morimoto et al. | 347/198 |
| 5,709,488 | 1/1998 | Ima et al. | 400/208 |
| 5,715,511 * | 2/1998 | Aslam et al. | 101/35 |
| 5,771,797 | 6/1998 | Dubuit | 101/37 |
| 5,806,420 | 9/1998 | Erhard et al. | 101/37 |
| 5,815,191 | 9/1998 | Michielsen et al. | 347/188 |
| 5,815,193 * | 9/1998 | Clevinger | 400/693 |
| 5,825,392 * | 10/1998 | Mochizuki | 400/693 |
| 6,000,329 | 12/1999 | Averill | 101/35 |
| 6,017,159 | 1/2000 | Tse | 400/208 |
| 6,019,526 | 2/2000 | Hebert | 400/58 |
| 6,148,722 * | 11/2000 | Hagstrom | 101/35 |

* cited by examiner

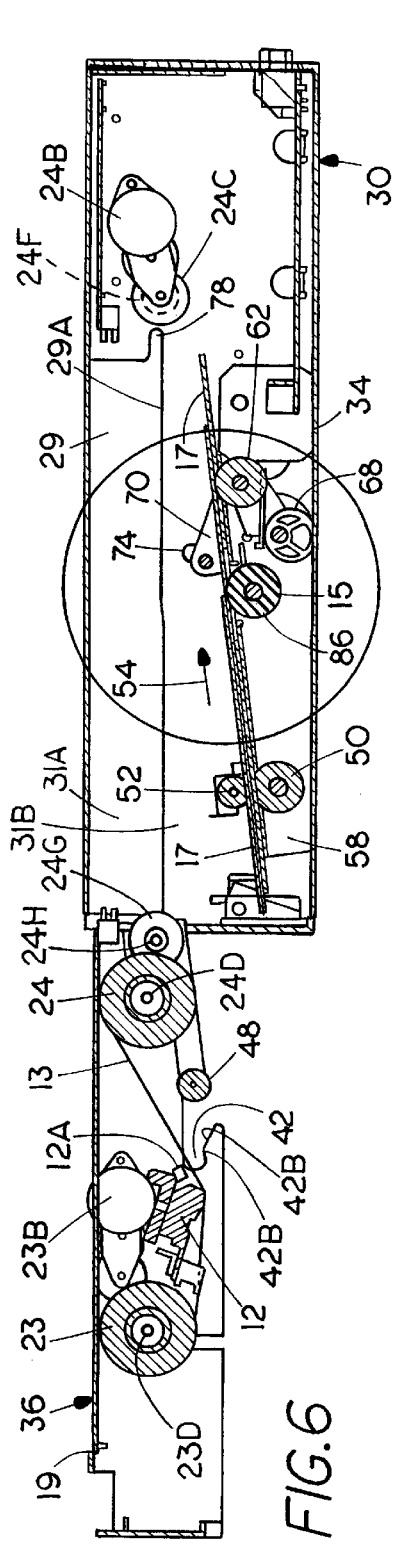
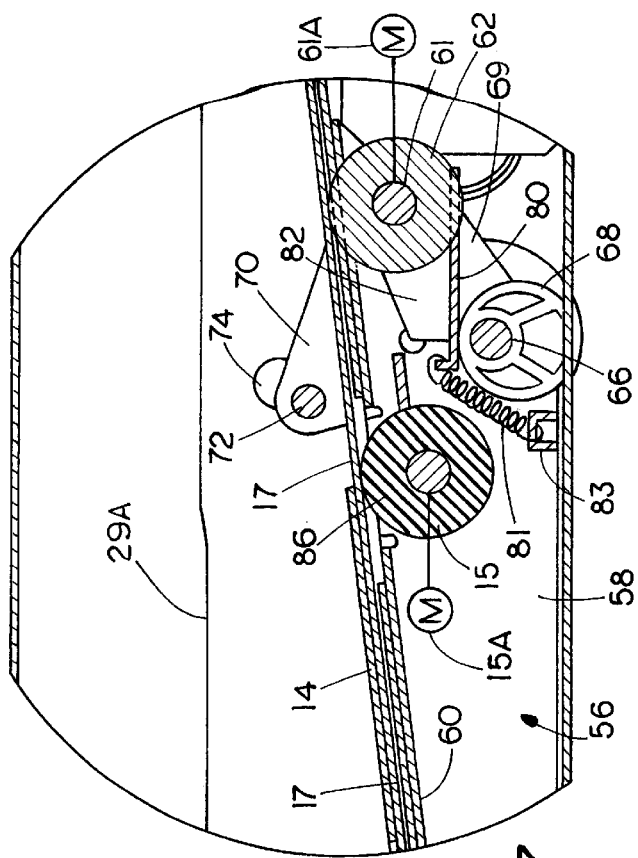
FIG. 6
FIG. 7

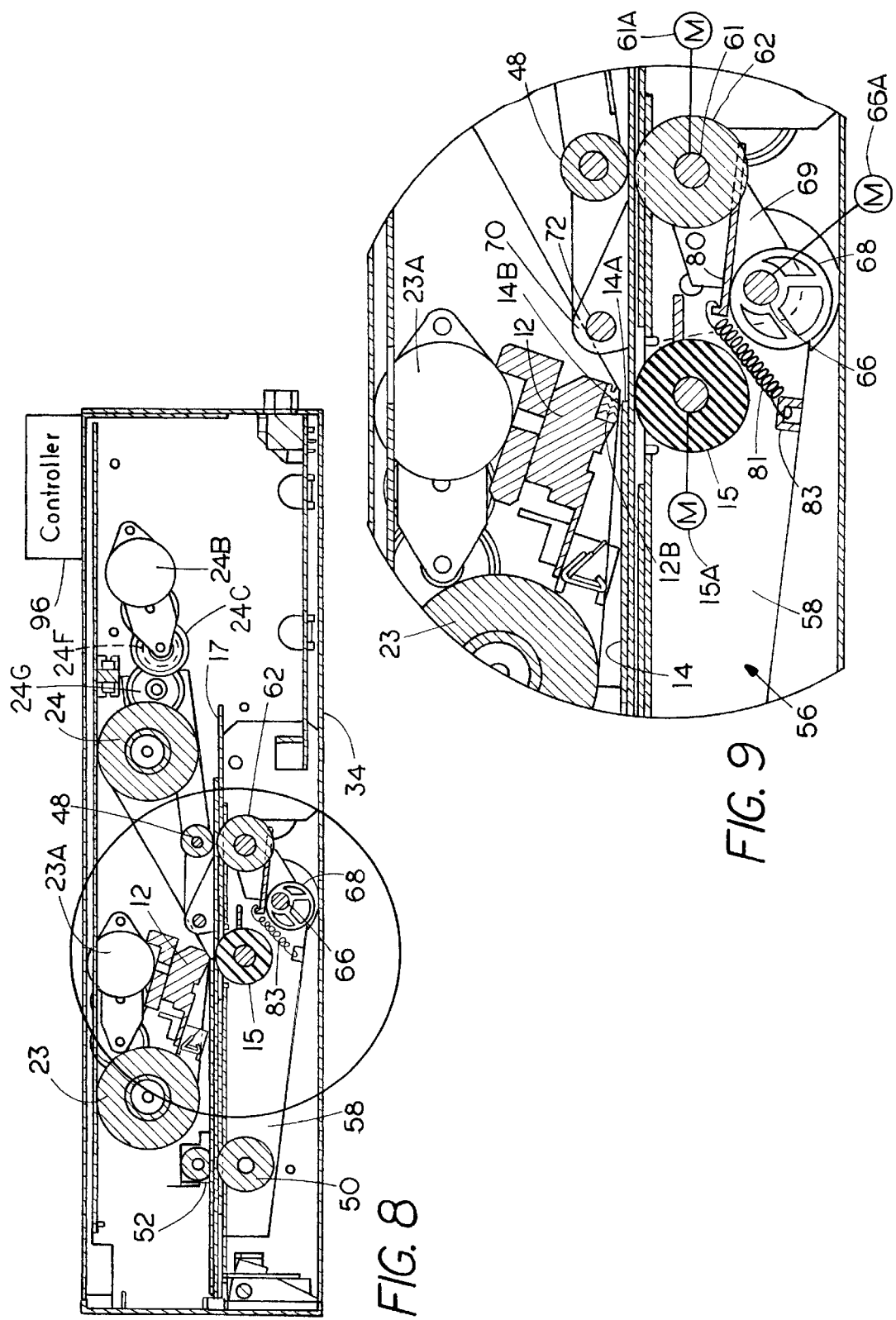

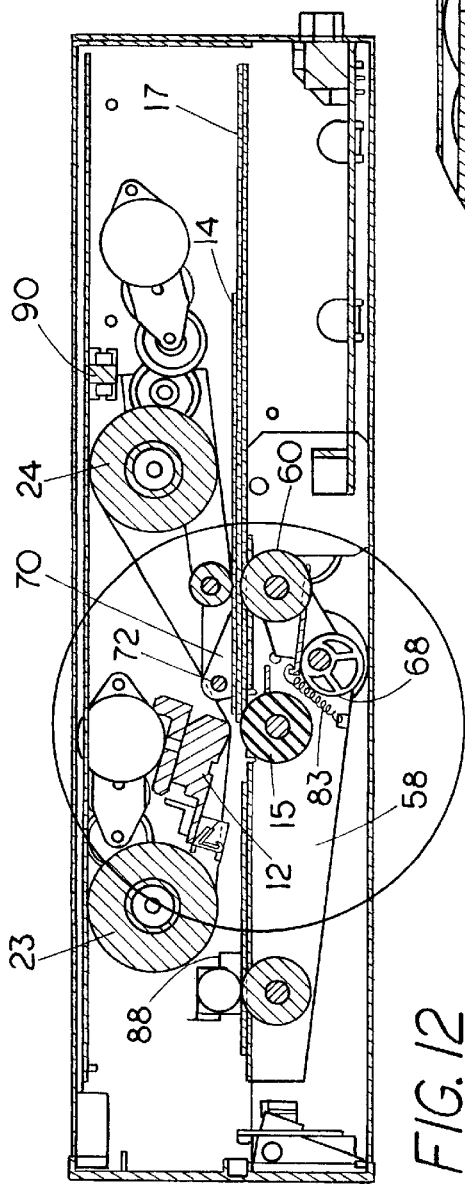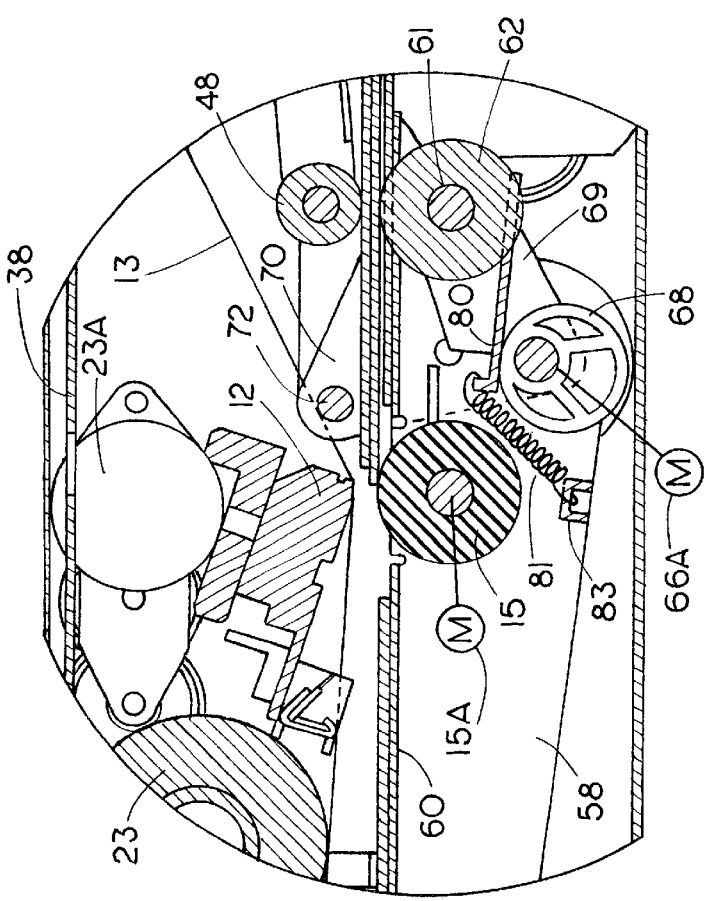
FIG. 12
FIG. 13

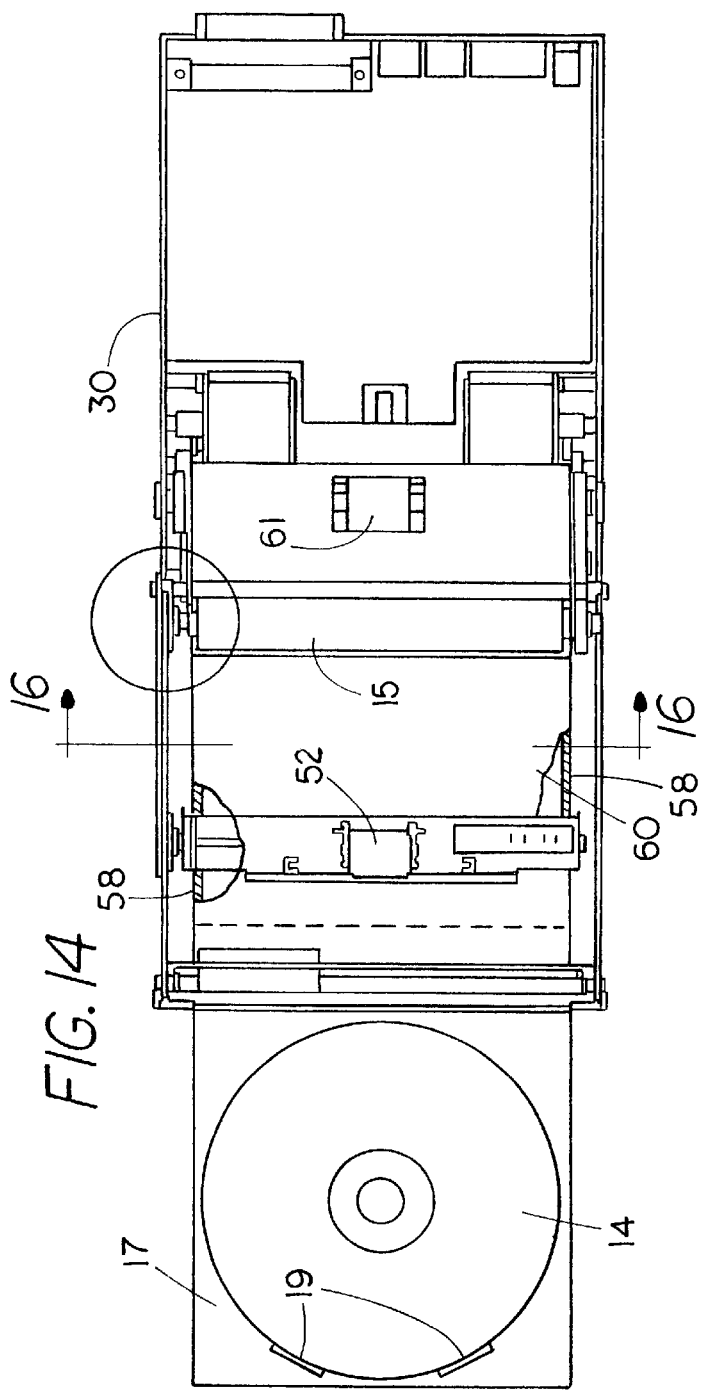
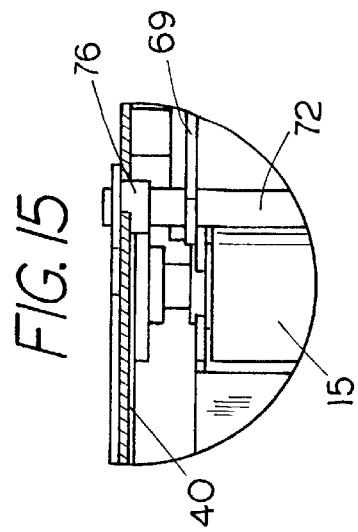

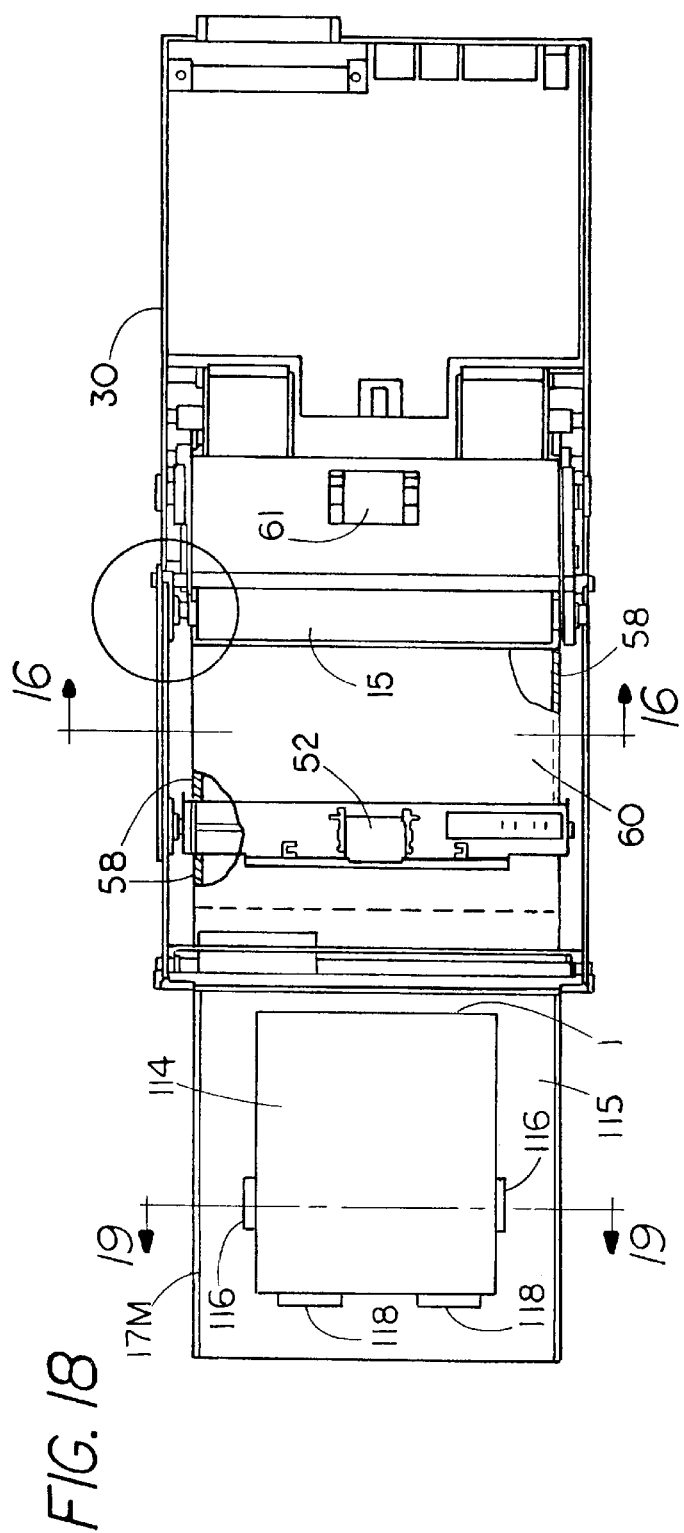
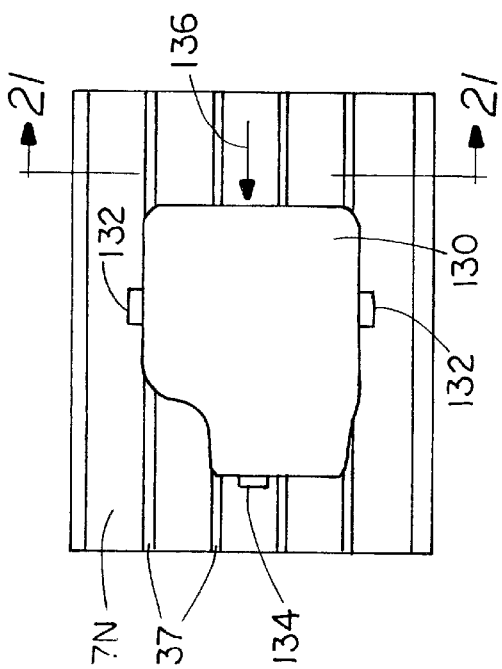
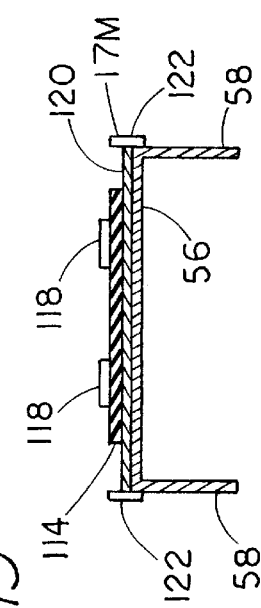

SUBSTRATE CARRIER AND PRINTHEAD MOUNTING FOR PRINTER

CROSS REFERENCE TO RELATED APPLICATION

This is a Continuation-in-part of U.S. patent application Ser. No. 09/326,041 now U.S. Pat. No. 6,148,722, Filed Jun. 4, 1999, for COMPACT DISC AND RECORDABLE COMPACT DISC THERMAL TRANSFER PRINTER, incorporated herein by reference, which in turn claims priority to Provisional Application Ser. No. 60/088,397, filed Jun. 8, 1998, and entitled COMPACT DISC (CD) AND RECORDABLE COMPACT DISC (CD-R) THERMAL TRANSFER PRINTER.

BACKGROUND OF THE INVENTION

The present invention relates to a printer that will print from a carrier ribbon, film or web to a substrate carried on a flexible support that is planar and is driven directly by rollers or drives. The substrate carrier can be removed from the printer to be changed, and/or for other manipulation, such as loading it into another device for a related operation on the substrate. A removed carrier can be driven back into the printer. A cartridge carrying the printhead is also provided.

Thermal printing technology for substrates, such as compact discs (CDs) and recordable compact discs (CD-Rs) and also identification cards incorporate pivotally mounted heads and linear platens with resilient surfaces and carriers that have clamping mechanisms for the substrate. The carriers are generally separately driven.

Current technology for printing onto plastic substrates uses expensive head actuating and force modifying mechanisms. The printhead is moved on pivotally mounted arms that extend substantially beyond the envelope of the printhead, with a linearly driven carriage that has to hold the disc over an expensive, flat resilient surface with a clamping device that moves with the carriage. Threading the ribbon through the printhead and mounting ports of the presently available printers is a tedious job which includes taping the ribbon to the carriage, then taping the ribbon after the carriage is driven into the printer. This leads to large, high-cost printers for plastic substrates such as CD's, CD-R's and digital videodiscs. It is desirable to substantially reduce the printer size in order to take less space for the CD printers, as well as reducing manufacturing costs and user interaction.

SUMMARY OF THE INVENTION

The present invention relates to a substrate carrier or tray and printhead cartridge that mount into a frame for reliably printing on flat substrates of various shapes, such as a rectangular ID card, CDs, CD-Rs, DVDs and irregular shapes. A substrate carrier or tray is substantially planar and is removable from the printer for loading. Friction drives that engage the planar carrier, such as one or more spring-loaded rollers are used. The substrate on the carrier is urged against stops by drive rollers, for positive positioning. The drive rollers shown act on a flexible or semi-flexible planar support that will move the substrate into the installed print cartridge.

A platen roller is mounted so that it and the carrier for the substrate can be moved against a printhead under a controlled spring force. The platen roller, in one form of the invention, can be slidably mounted, and can be urged toward the printhead with springs that can be varied in force. In another form of the invention, the platen, the substrate carrier and the substrate are mounted on a pivoting frame and urged up against the printhead where the force is reacted by the printhead for contact printing.

The pivoting frame mounts not only the platen, but also drive rollers for the substrate carrier. The force with which the platen, carrier and/or substrate are urged against the printhead during the loading and printing operation is controlled by a cam that acts on a cam follower connected to the platen frame by springs so that the frame pivots toward the printhead under spring load. One drive roller for the substrate tray or carrier is on the pivoting frame and rests against a spring-loaded pinch roller. The printhead cartridge also carries the printhead and a second pinch roller. The platen is spring-loaded and resilient to load the cartridge and the substrate against the printhead, which is held in a fixed position. A second drive roller is provided on the printer housing and cooperates with the second pinch roller, so the carrier is driven by rollers after it has passed through an inlet opening.

According to another aspect of the invention, a printhead cartridge contains the printhead, as well as the ribbon, film or web supply and take-up rollers. The cartridge permits easy loading of the ribbon since the ribbon does not have to be threaded through pairs of rollers or openings, and does not require special "lead-in" tapes or the like. Also, the printer provides easy front loading of both the printhead cartridge and the substrate carrier. The outer printer housing fits within a PC box or other container.

The flexible or semi-flexible planar substrate carrier or tray is moved in and out with motors or drives that are synchronized for printing and for insertion and removal. The carrier for the substrate can be adapted to a wide range of shapes, because the substrate is seated by being held against edges or stops on the carrier by the action of the five rollers. Alternatively, the carrier can have a recess formed to the peripheral shape of the substrate to provide for positioning the substrate.

BRIEF DESCRIPTION OF THE DRAWINGS

FIG. 6 is a horizontal sectional view of the device shown in FIG. 5 taken generally along line 6—6 in FIG. 4;

FIG. 6A is a side view similar to FIG. 6 with the cartridge carrying the printhead and ribbons partially installed and about to be latched;

FIG. 6B is a view similar to FIG. 6A with the printhead fully in place and the cartridge carrying a substrate to be printed on the exterior of the main cabinet;

FIG. 7 is an enlarged sectional view of a portion circled in FIG. 6;

FIG. 8 is a sectional view similar to that shown in FIG. 6 with the printhead and cartridge in working position, and printing about to start on a circular substrate or disc;

FIG. 9 is an enlarged fragmentary view of a portion of the assembly shown circled in FIG. 8;

FIG. 12 is a sectional view similar to FIG. 8, when the platen frame is lowered, after printing is done to allow the print ribbon to advance and the substrate and carrier to be moved back for another pass;

FIG. 13 is an enlarged sectional view of the circled portion in FIG. 12;

FIG. 14 is a top plan view of the printer with the platen frame in position in cross section, with the printhead cartridge removed for sake of clarity;

FIG. 15 is an enlarged sectional view of a portion circled in FIG. 14;

FIG. 18 is a top plan view similar to FIG. 14, illustrating a modified form of the substrate, in the form of an identification card carried on the carriers;

FIG. 19 is a sectional view of a typical character taken on line 19—19 in FIG. 18;

FIG. 20 is a top plan view of a further modified tray or carrier for carrying an irregularly shaped substrate on which printing is to be placed;

DETAILED DESCRIPTION OF THE PREFERRED EMBODIMENTS

Figure 1:
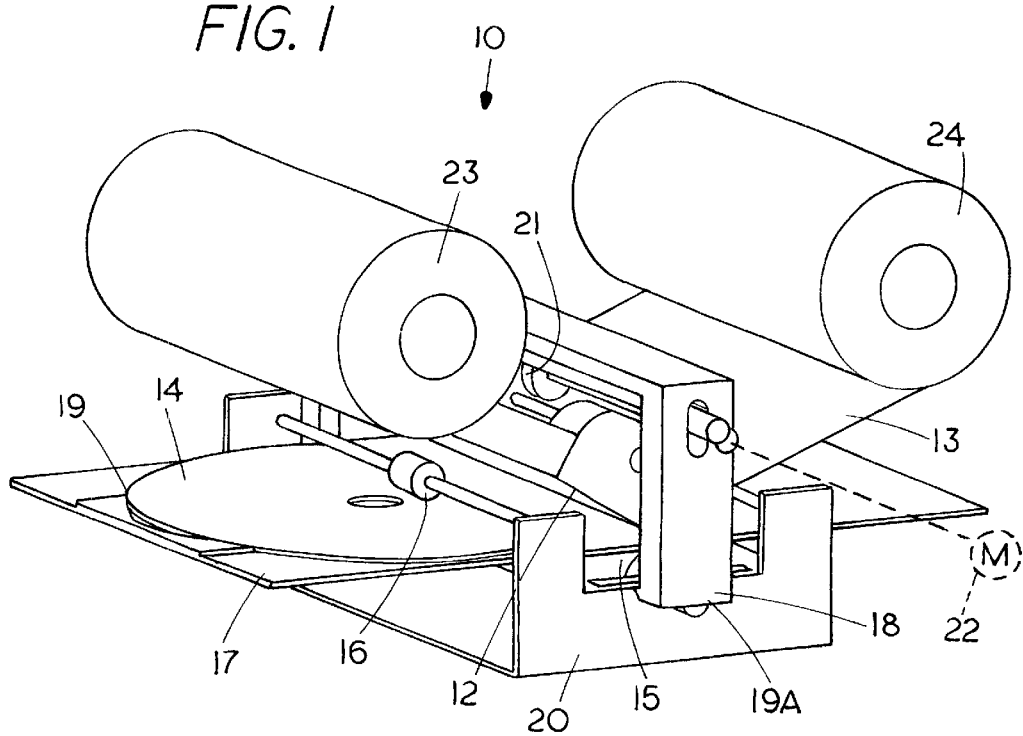
FIG. 1 is a schematic representation of one form of the present invention.
Figure 2:
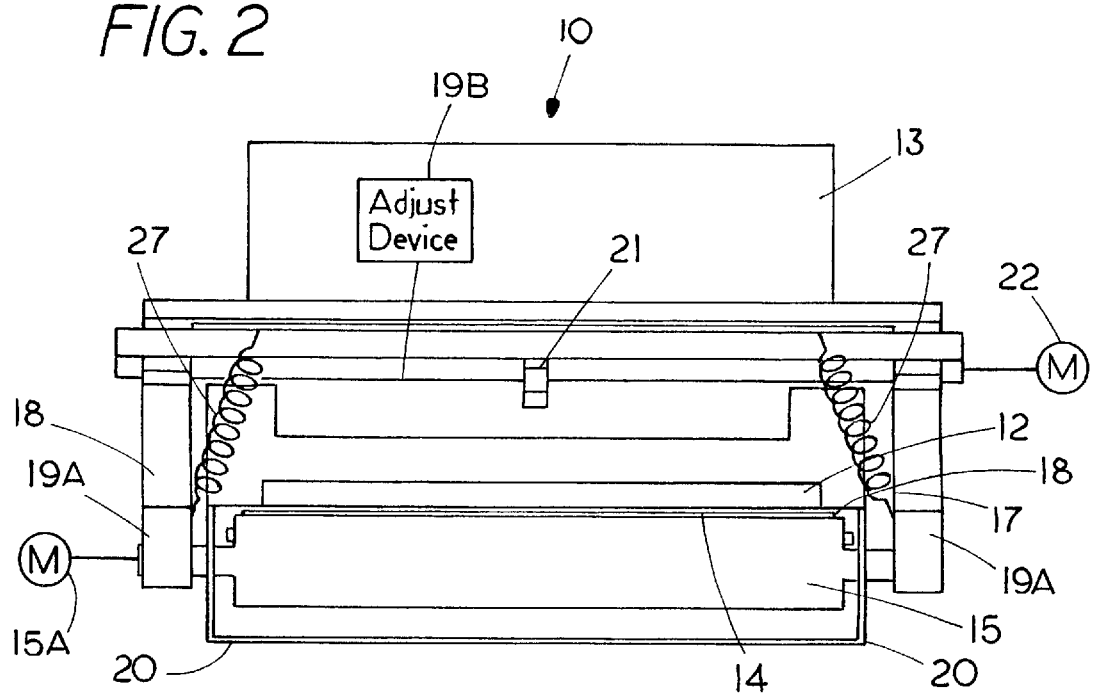
FIG. 2 is a front view of the form of the invention shown in FIG. 1.
Figure 3:
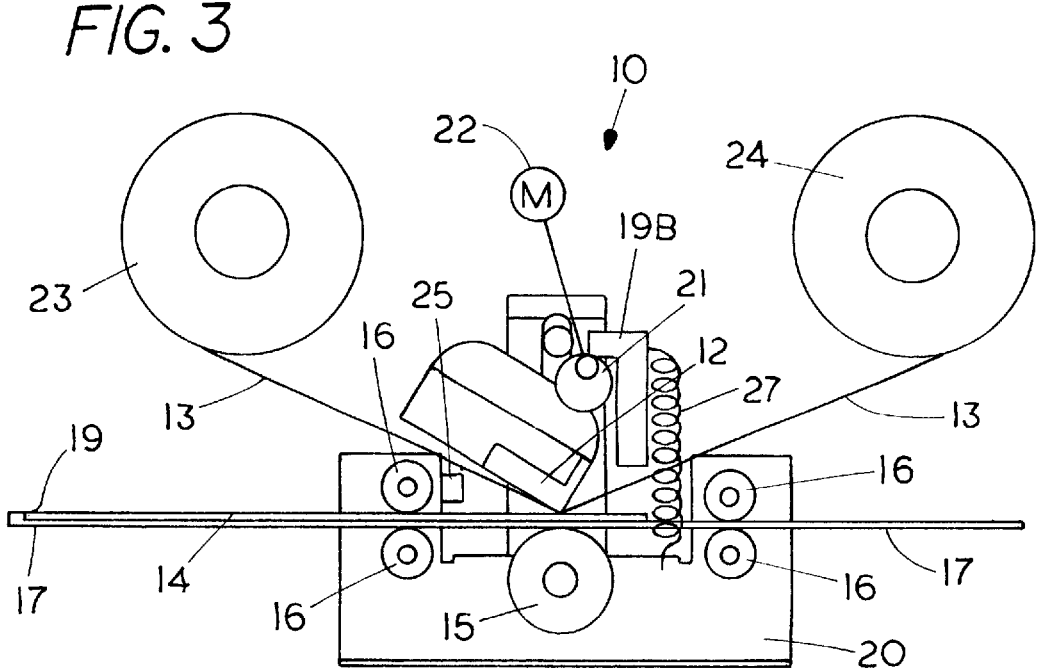
FIG. 3 is a schematic side-elevational view of the device of FIG. 1, again schematically illustrated.

FIGS. 1 through 3 show a schematic view of a printer 10 embodying the principles of the present invention and in the illustrated embodiment includes a printhead 12 that has a series of very small heat elements (resistors) that transfer a base coating or an imaging compound, wax, resin or resin composites or sublimation dyes from a carrier ribbon, film or web 13, to a substrate 14. The substrate 14 may be an identification card of rectangular or irregular shape, a circular compact disc, a recordable compact disc, a DVD disc or other desired substrate that is to receive printing. The platen 15 is used to force the substrate 14 against the ribbon 13 and create intimate contact between the printhead, ribbon and substrate. The substrate is carried on a generally planar, flexible or semi-flexible support tray or carrier 17. The carrier can be used with other types of printers such as ink jet printers, or with other devices that perform one of a series of operations in a process, such as a device that records data on CD's. The platen 15 will be controlled to push the carrier 17 and the substrate thereon toward the printhead so the substrate is urged against the printhead 12 with the desired amount of force for printing images.

Images are created in the form disclosed through control of the heat elements on the thermal transfer printhead to selectively apply imaging compound from the web or ribbon 13 to specific areas of the substrate. Colors can optionally be created with multiple passes using a panelled ribbon, combined with dithering techniques to create several perceived colors, as is known.

The platen roller 15, which is driven by a stepper motor 15A, can be controlled so as to control the speed of driving the carrier 17 and the substrate 14, as it is held against the printhead 12 under a fixed spring load. The carrier is rigid enough so that it can support the weight of the substrate when it is fully extended out from the printer, as will be shown in subsequent drawings, in a position linearly horizontal to the plane of the tray or carrier as the substrate is being printed, and yet will have some "give" or flexibility as the platen roller 15 urges the carrier 17 and the disc 14 on the carrier against the printhead and as the rollers 16 feed the carrier through the printer. The force with which the platen roller engages the carrier 17 and thus the force with which the disc is urged against the printhead is controlled by springs 27.

Brackets 18 are used for mounting the platen relative to the printhead as shown schematically, and the platen roller 15 can be moved out of the way, so that a frame that contains the printhead and ribbon can be removed from the printer easily.

Power supplies generally are those of a PC, and the printer can be driven from a personal computer. The platen roller is mounted in such a way that it is held against the carrier or support tray 17 in a floating manner without a pivotally mounted frame, such as by providing slots for guiding the carrier. The platen roller 15 is clamped to the printhead frame through intermediate brackets 18 and 19A which can be unclamped and allow the platen roller to drop away from the printhead. By unclamping and moving the platen roller out of the way, the ribbon can be installed in a straightforward fashion.

The clamping brackets 18 and 19A can be actuated fairly easily through a cam system mounted just above the printhead. This system saves space and allows for electronic control of the head force. The substrate and membrane or carrier are held by the pinch rollers 16 of the roller sets. The pinch rollers are the upper rollers and will first roll along the upper surface of the carrier 17. When the leading edge of the substrate comes against the upper pinch roller it will slide along the surfaces of the carrier, the force of the pinch roller 16 will locate the substrate on the membrane by forcing or urging it up against a reference edge or stop 19 on the carrier when first being engaged. The reference edge or stop 19 and the squeezing action of the rollers 16 serve to position and then clamp and hold the substrate in a controlled, known position throughout the printing process. No separate clamping of the substrate is needed.

The chassis of the printer has a moveable portion 20 that allows the platen roller 15 to move vertically while maintaining the fixed horizontal position of the platen roller. The vertical movement is accomplished through a camshaft 21 mounted through the top portion of the chassis (which is fixed and non-moveable). The camshaft 21 is driven by a stepper motor 22 and has two springs 27 which are attached to a shaft or bracket 19A which is driven by the camshaft on one end and pivotally attached to the moveable portion 20 of the chassis on the other so it tilts. By incrementally moving the camshaft 21 by actuating the stepper motor, 22, the roller 15 can be raised or lowered under spring force, thus creating the pressure upon the support tray or carrier 17. This allows the platen roller 15 to act as a pinch roller in the sense that as it is raised, it pinches the support tray or carrier 17 and the substrate between itself, the printhead and the ribbon. The pinching action creates pressure that is applied to the substrate as it passes under the printhead, depending on the position of the camshaft.

The springs 27 act on the platen to move it up in a desired manner, toward the planar carrier 17 to act against the printhead 12.

Figure 4:
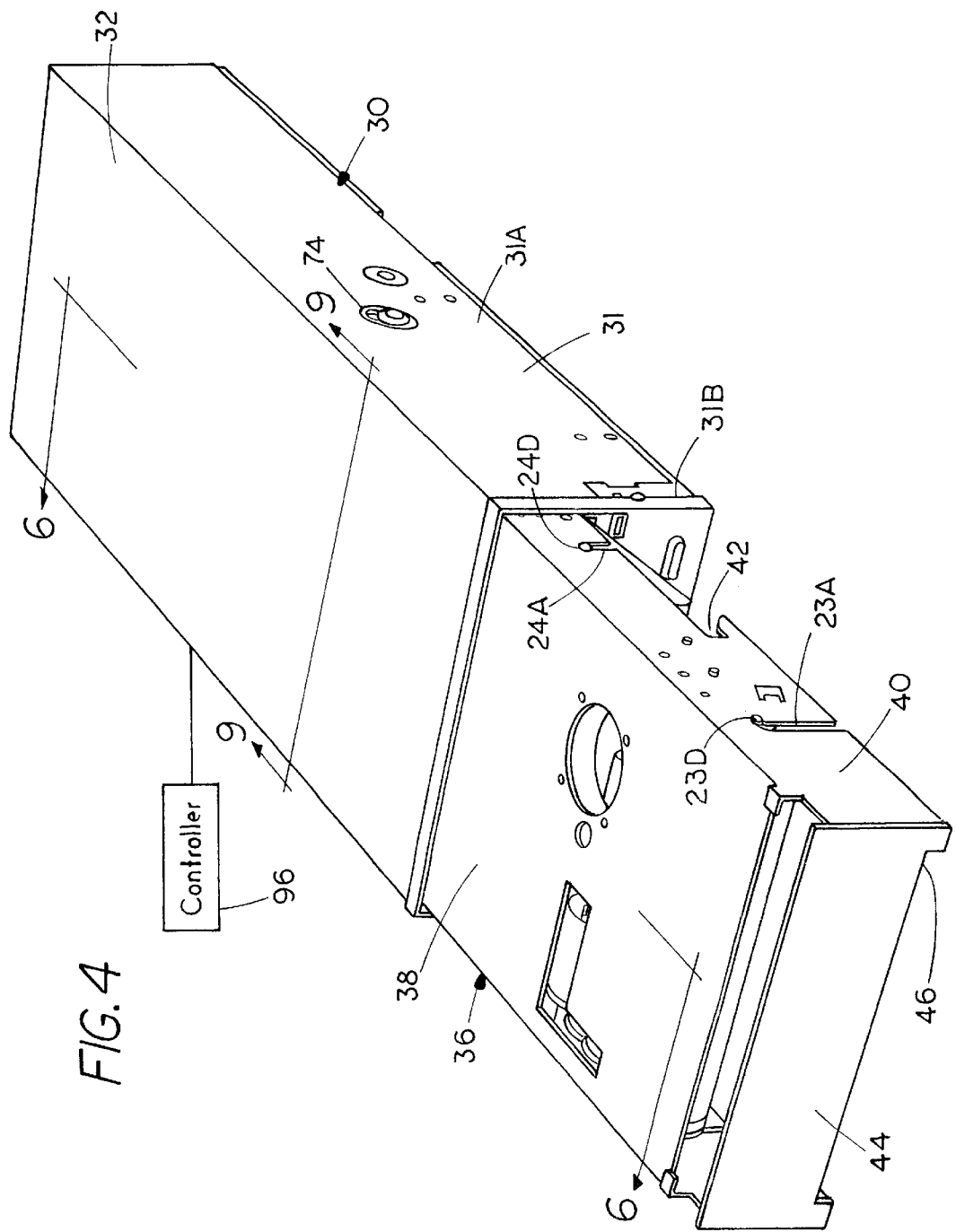
FIG. 4 is a perspective view of a housing or cabinet showing a printhead cartridge on which the printhead is located about to be inserted into the cabinet.
Figure 5:
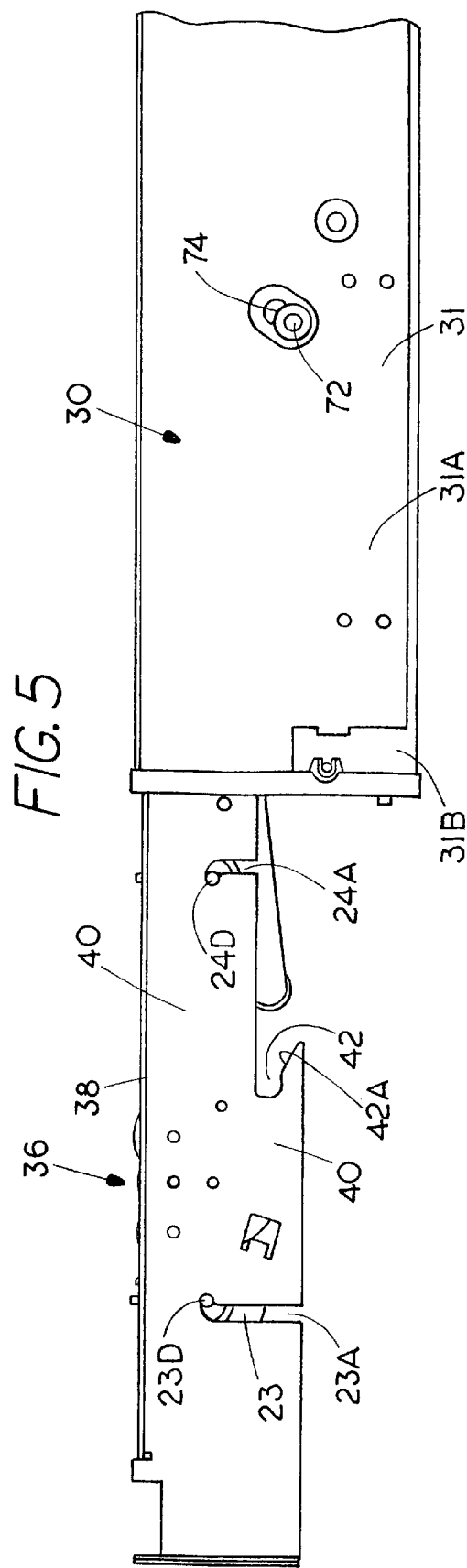
FIG. 5 is a side elevational view of the form of the invention shown in FIG. 4.
Figure 16:
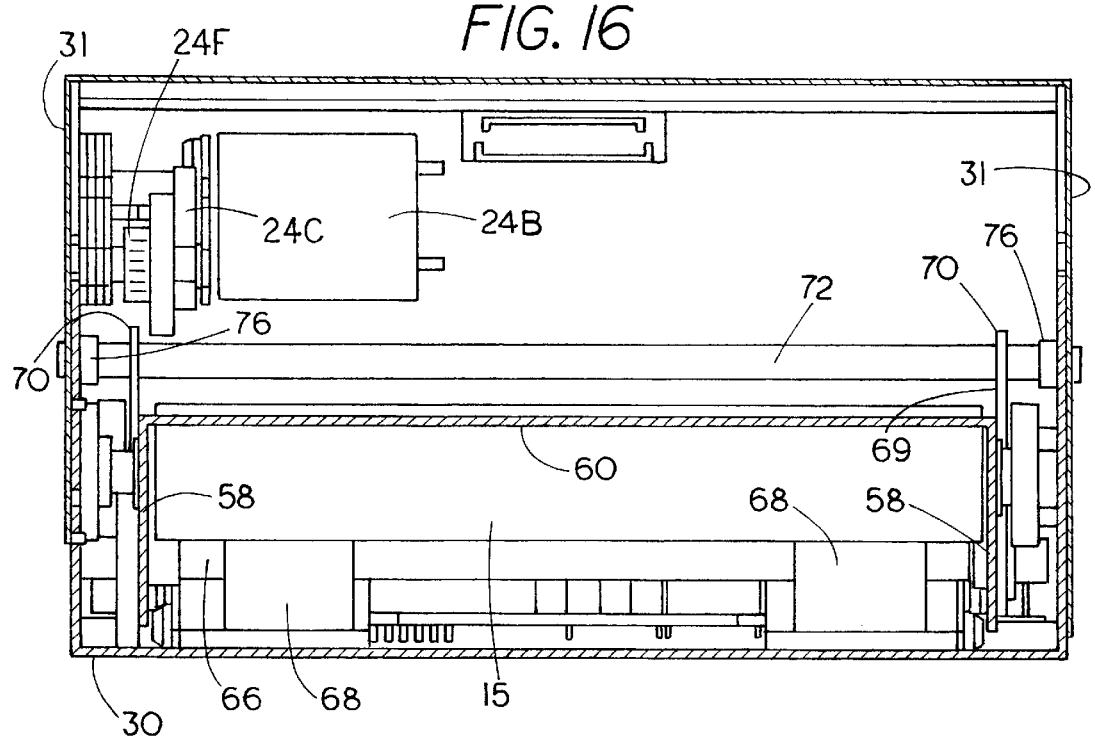
FIG. 16 is a sectional view taken generally along line 16—16 in FIG. 14.

In FIGS. 4 through 20, a further illustrative embodiment is shown. Referring first to FIG. 4, a main cabinet 30 forms a housing that has side walls 31, and a top wall 32 as well as a bottom wall 34, (see FIG. 6, and other Figures for example). A printhead cartridge assembly 36 that is a unitary assembly has a top wall 38, and depending side walls 40. The side walls 40 are made to fit between the side walls 31 of the main housing. The side walls 31 have an outer panel 31A and an inner panel 31B (FIGS. 6 and 16). It can be seen that the side walls 40 of the printer head cartridge include a latch recess 42 on each side that will be used for holding the printhead cartridge assembly 36 in position when it is fully inserted into the housing 30. Also, as can be seen in FIG. 6, a cutout portion 29 of the inner panel 31B of wall 31 has a support edge 29A that will support the printhead cartridge 36 in proper position. As shown in FIG. 14, the ends of shafts 23D and 24D will slide on edges 29A on each side of the housing.

The printhead cartridge 36 has a front wall 44 that includes a recess 46 that will permit the substrate support or carrier 17 and substrate 14 such as a CD, CD-R, DVD, ID card or the like to be on the exterior of the housing for loading, and then driven into the housing 30 for printing.

In FIG. 6, it can be seen that the supply roll 23 for the ribbon film or web 13 and the take-up roll 24 for the ribbon, film or web are mounted onto the side walls 40 of the printhead cartridge. The slots 23A and 24A shown in FIGS. 4 and 5 mount the shafts 23D and 24D for these supply and take-up rollers and hold the shafts in off-set notches. The thermal printhead 12 is mounted to the side walls 40 of the printhead cartridge assembly 36, and is fixed in position. The print supply and take-up rollers 23 and 24 can be easily installed by moving the shafts 23D and 24D up from the bottom of the cartridge in slots 23A and 24A in the side walls 40 of the cartridge, without the need for threading the film or ribbon through particular rollers or slots. The ribbon will be passed over the printhead without threading it through any openings. The ribbon is thus simply laid over the exposed edge of the printhead when the rolls 23 and 24 are installed. Effortless loading of the ribbon is possible with the printhead cartridge removed from the housing.

A suitable sensor 12A can be used for sensing the ribbon 13 for various controls. A motor 23B can be used for driving the ribbon or web supply roll 23. The ribbon take-up roller 24 will be driven from a motor 24B through a gear train 24C that includes a spur gear 24F on a shaft on the housing side wall that will drivably mate with a spur gear 24G when the printhead cartridge assembly is moved into position in the housing 30. The gear 24G is mounted on a pin or shaft 24H.

A spring loaded pinch roller 48 is mounted on the printhead cartridge assembly 36, and will cooperate with drive rollers, as will be explained, for driving the carrier 17 and the disc 14 across the printhead for printing.

In FIG. 6, the housing 30 is also shown in cross section. The carrier 17 is mounted for movement with a drive roller 50 at an input end of the housing that cooperates with a spring loaded pinch roller 52 to engage the tray or carrier 17 and drive it in direction as indicated by the arrow 54 (or in reverse). A platen and carrier support frame 56 has a top plate 60 and a pair of side walls or arms 58, 58 to form an inverted channel. The drive roller 50 and pinch roller 52 are carried on shafts extending between the arms 58. The carrier 17 moves over the top plate 60, which is supported on the arms 58 that are pivotally mounted on the axis of a shaft 61 of a drive roller 62. The arms 58 and top plate 60 extend toward the input end of the housing 30. The frame 56 is in a lowered position in FIG. 6.

The platen support top plate 60 joins the side arms or walls 58. The drive roller 50 and platen roller carry and drive the carrier 17 and substrate 14 into printing position after the cartridge 36 is in place, as will be shown. The shaft 61 and roller 62 are suitably driven with stepper motor 61A, and will drive the carrier 17 during the printing process. After the printhead cartridge has been moved into place, the drive roller 62 will also cooperate with the pinch roller 48 on the printhead cartridge for providing a driving force when the printing has commenced, and the tray or carrier 17 is being moved in direction indicated by arrow 54

Figure 7A:
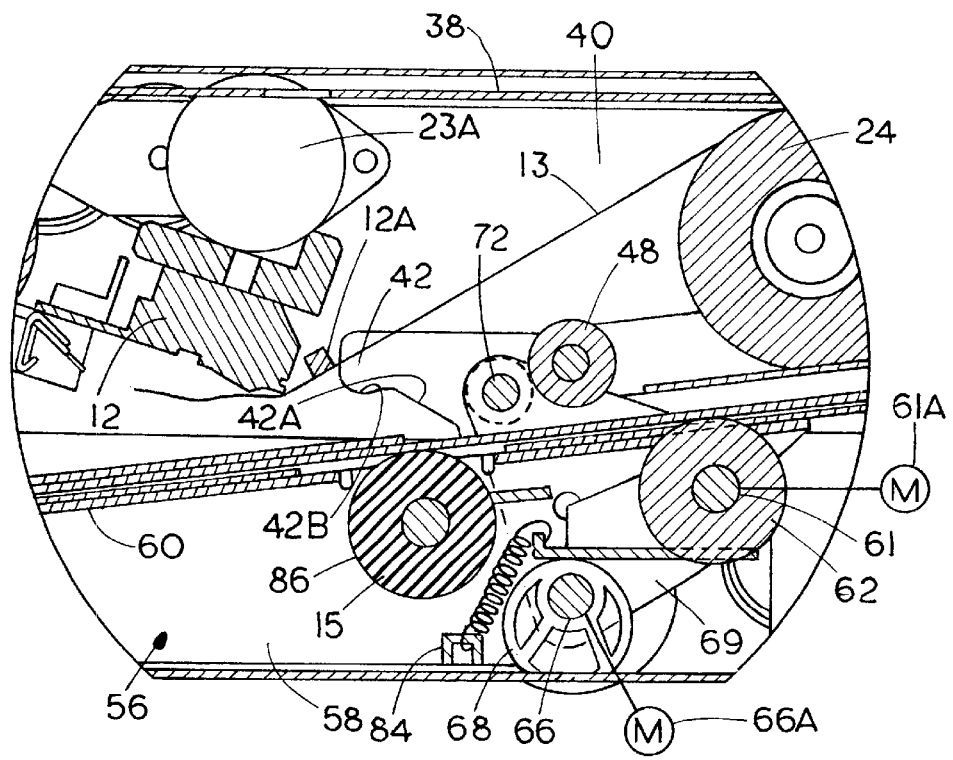
FIG. 7A is a sectional view similar to FIG. 7 with the portion enlarged circled in FIG. 6A.
Figure 7B:
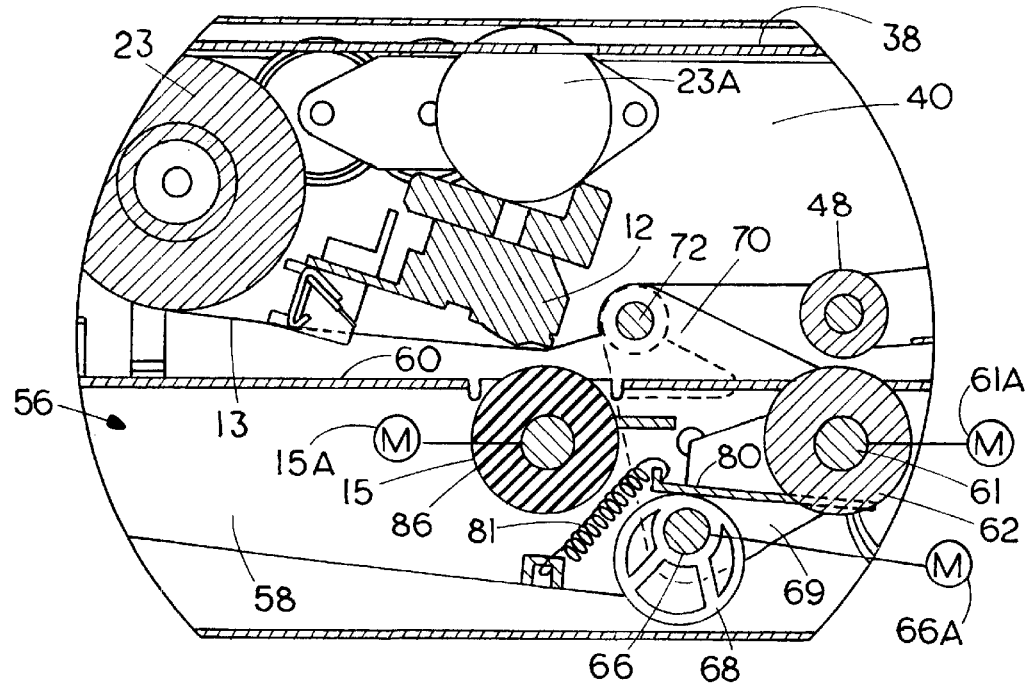
FIG. 7B is an enlarged view of the portion of the circle in FIG. 6B.

As can be seen in FIG. 7, which is an enlarged cross section view, the side arms or walls 58 of the platen support frame 56 are to the side of triangular plates 69 that are pivoted on shaft 61 adjacent the housing side walls as well. There is a plate 69 on each side of the platen support frame 56. Plates 69 rotatably mount a cross shaft 66 on which a pair of cam rollers 68 are mounted. The cam rollers 68 are also shown in FIG. 16. The cam shaft 66 is driven by stepper motor 66A under control from controller 96 and the platen roller stepper motor 15A is also controlled by controller 96 so the platen drive motor and camshaft drive motor can be controlled under common control.

Figure 17:
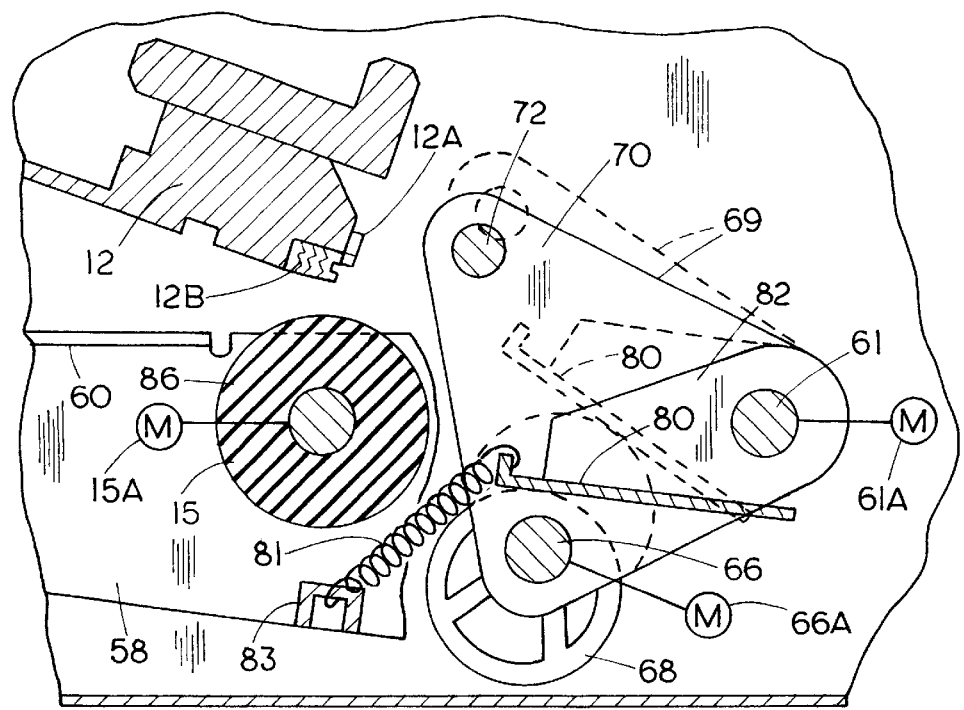
FIG. 17 is an enlarged view of a printing shaft support and a cam follower plate with parts of a side wall of a platen frame broken away.
Figure 21:
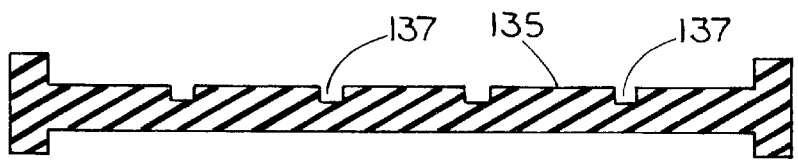
FIG. 21 is a sectional view taken on line 21—21 in FIG. 20.

Upstanding ears 70 are part of plates 69, which are independent of the side arms 58, and these ears 70 hold a cross shaft 72 in position, (see FIG. 17 as well). The ends of the shaft 72 extend through slots 74 in the side walls 31 of the housing, so that there can be some movement of the shaft 72 to permit the printhead cartridge 36 to be inserted into the housing 30 and latched in place using shaft 72. Shaft 72 has bearing hubs 76 at its ends, again as shown in FIGS. 15 and 16, and the receptacles 42 on the side walls 40 of the printhead cartridge are of size to receive these hubs 76 as the printhead cartridge assembly 36 is inserted into place. The receptacles 42 are formed with a guide edge or a lead-in edge 42A that will slip under the hubs 76 and lift the shaft 72 so that the hubs 76 on the shaft 72 can slip into the receptacles 42, and detent in place in recesses 42B. When the printhead cartridge is moved into this position, the ends of shafts on the cartridge, including shaft 24H mounting gear 24G, protrude outwardly from the side walls 40 sufficiently to slide into open-ended slots 78 (see FIG. 6 for example) so that the printhead cartridge 36 is held from unwanted movement relative to the housing 30, and the drive gear from gear train 24C meshes with gear 24G, the takeup rollers thus driven by the motor 24B.

Figures 6A, 6B:
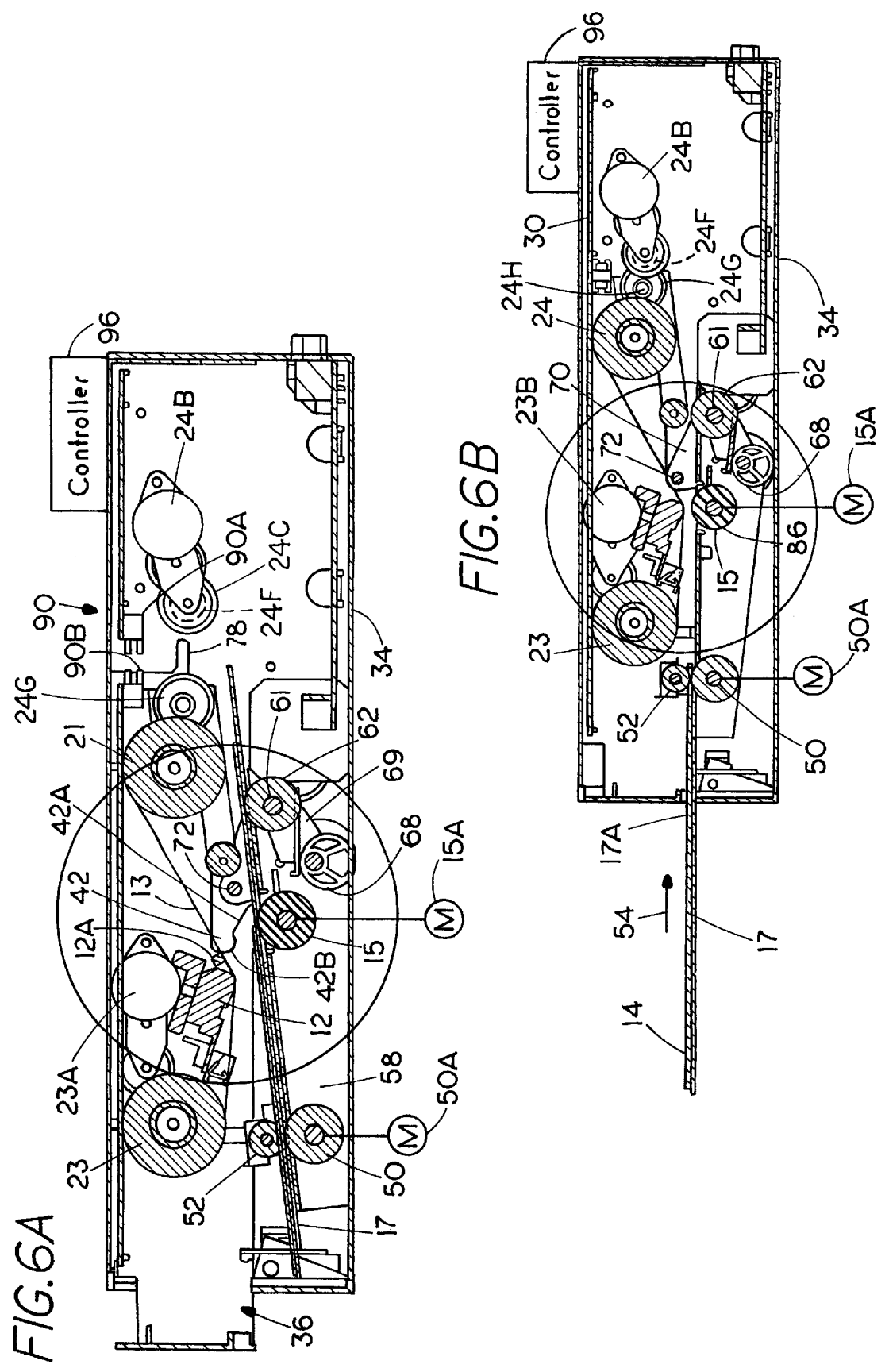

Cam rollers 68 carried on shaft 72 act against a pivoting cam follower plate 80 which has side arms 82 on opposite sides of the housing 30 pivoted on shaft 61 as well (see FIG. 17). When rotated, the cam rollers 68 will change the pivoted position of plate 80. Springs 81 carried on the edge of plate 80 are used to apply a load to the frame 56 through a cross member 83 that mounts on walls 58 and on which end of springs 81 are hooked. When the printhead cartridge 36 is inserted, shaft 72 is lifted to enter the receptacles 42, which lifts the frame 56 to its loaded and operating position as shown in FIG. 6B. The frame 56 also can be moved a limited amount by moving cam rollers 18 to exert or remove lifting forces. When the substrate engages the printhead, the force by which the platen urges the substrate against the printhead can be increased by moving the cam rollers 68 to increase the tension in springs 81. The cams can be moved to a lowered position to slightly space the platen, and substrate from the printhead for ribbon removal or fast ribbon feed.

The platen roller 15 is driven by stepper motor 15A. The tray or carrier 17 and the substrate 14 are also driven through the printing cycle under the printhead 12, and force from the springs 81 urges the platen roller 15 upwardly to act as a pinch roller that drives the carrier 17 and substrate 14 across the printhead. The platen 15 also has an outer resilient covering 86 as shown, and the tray or carrier is flexible so it will conform to some irregularities in the substrate or components.

Positioning the printhead cartridge assembly 36 for sliding into the housing 30 is illustrated schematically in FIG. 6, where the printhead cartridge is disengaged. The printhead cartridge assembly 36 is entering the provided opening in the front of the housing 30 for insertion. It can be seen in FIGS. 6A and 6B, that the side members 40 of the cartridge assembly 36 are approaching the shaft 72 that has the hubs 76 (FIG. 15) for retaining the cartridge when it latches in place. In the view in FIGS. 6A and 7A, it can be seen that the receptacles 42 and guide edge 42A on each side are approaching the shaft 72. This is also shown enlarged in FIG. 7A. The print ribbon 13 from the supply roller 23 and take-up roller 24 is under the printhead 12, and then the printhead cartridge assembly 36 will be slid into place as shown in FIG. 6B held by the shaft receptacles 42, and the slots 78 at one end. When the printhead cartridge is fully inserted, as shown in FIG. 6B, the frame 56 and the tray or carrier 17 are lifted and the outer end is aligned with the end opening or recess 46 of the housing so the carrier can be moved out of the housing and loaded or it can be completely removed, and a carrier already loaded with a different shape substrate or the same shape inserted.

In FIG. 6B, the substrate carrier 17 is shown in its loading position, having been driven there by the drive rollers 50 and pinch roller 52 outwardly under control of a controller 96. The signal to drive the carrier 17 out of the housing can be manual or programmed. The substrate 14 can be put onto the carrier and located against edge or stop 19. This is also shown in FIG. 14.

The drive roller 50 can then be driven from a suitable stepper motor 50A under control of central controller 96 to move the carrier 17 and substrate 14 in the direction indicated by the arrow 54 and so that the leading end 14A of the substrate 14 first engages the pinch roller 52 which is against the top surface of the carrier 17 and will exert a force moving the back edge of the substrate against stop 19. The carrier and substrate are then moved by the drive under the printhead.

While, for simplicity, this description has shown individual stepper motors for platen roller 15 and rollers 50 and 62, these rollers can be driven together with gears (or timing belts) using only one stepper motor, such as motor 61A.

Figure 10:
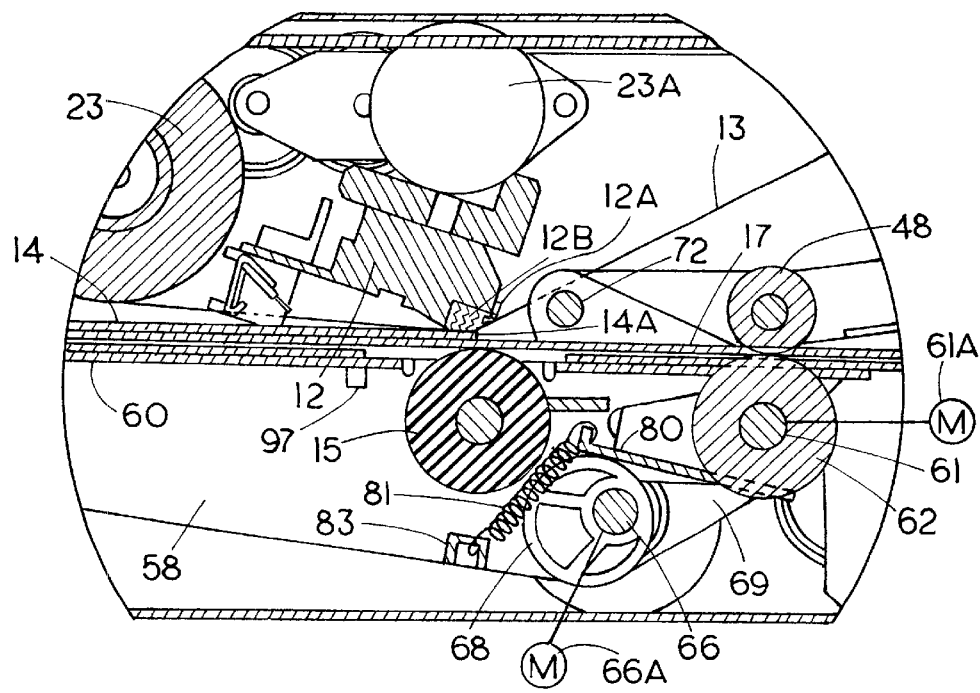
FIG. 10 is an enlarged sectional view of the portion shown in FIG. 9 with printing about to commence.

The start of the printing cycle is shown in FIG. 10, where the leading end 14A of substrate or disc 14 is immediately under the printhead 12, which has the resistors forming heating elements 12B to provide print heat. The platen roller 15 is urged up by the cam rollers 68 acting through the plate 80 and springs 81 to provide a force to urge platen support frame 56 and the platen roller 15 about the pivot axis up against the carrier 17. A standard, uniform force can be used to urge the substrate 14 against the printhead 12.

Figure 11:
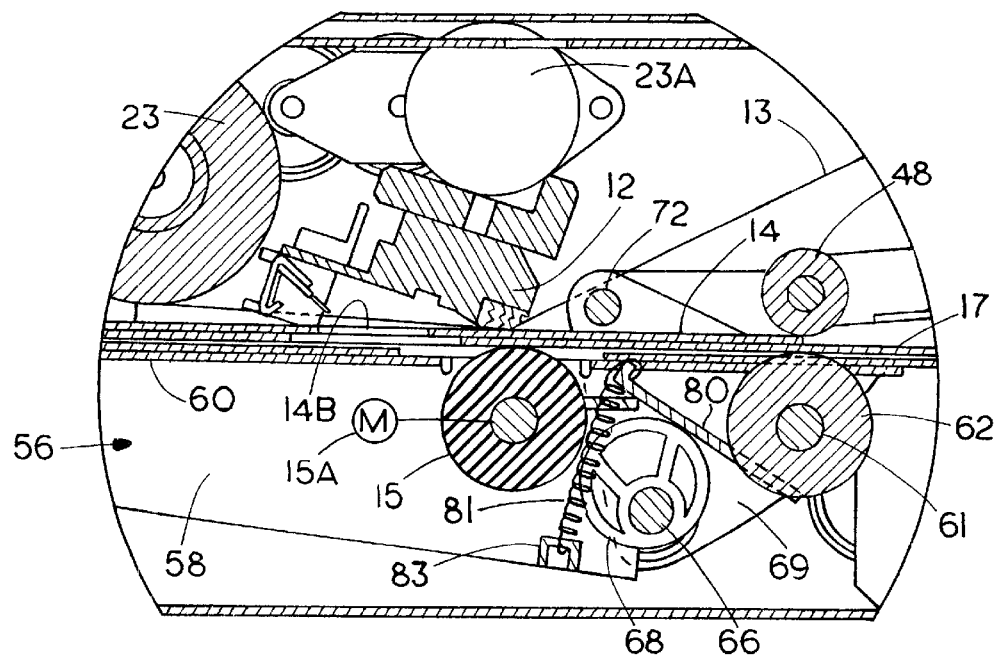
FIG. 11 is a sectional view similar to that shown in FIG. 10, with the printing about a third of the way through, where a maximum chordal length of the print area on the circular substrate is encountered near the center opening of a CD.

FIG. 11 illustrates the positioning of the substrate 14 when it has been fed approximately ⅓ of the way through the printhead by the drive rollers 50 and 52 and by drive roller 62.

The printhead opposes the force from platen 15. The cartridge is held in position by slots 78. Shaft 72, which seats in receptacles 42, and the cam shaft 66, are both mounted on plates 69, as can be seen in FIG. 17. Thus the forces on the platen and printhead from spring 81 are contained within the plates 69.

In FIGS. 12 and 13, the substrate has been moved from under the printhead 12, and the print ribbon 13 is being advanced. The cams move so the platen support frame 56 pivots down slightly and platen roller 15 is permitted to move away from the printhead 12, to permit the ribbon, film or web 13 to be advanced so that the next color can be printed. If multi colors are to be printed, the tray or carrier 17 and the substrate 14 would be reversed in direction and another layer printed over the same region. The substrate 14 is indexed appropriately using suitable sensors such as the sensor shown at 88 in FIG. 12. The signal from the sensor will be used to coordinate the position of the substrate 14 with the ribbon, film or web 13 and a particular color panel that is on that film.

When printing is done, the tray or carrier 17 is lowered or released from the printhead by moving cam 68 and then the tray or carrier is backed out of the housing and the printed substrate 14 removed. A new substrate is put onto the carrier 17 and the printing is repeated anew. If desired, a new carrier 17 can be inserted, since the carrier 17 is held only by the drive and pinch rollers and can be moved completely out of the rollers 50 and 52.

FIG. 18 illustrates the printer of the present invention, with the same designations on the printer as before, but a substrate carrier illustrated at 17M is modified to carry a substrate 114 that is rectangularly shaped, and which is held in position on the upper surface 115 of the carrier 17M with suitable stop members 116, along the sides, and 118 along the trailing edge. The substrate 114 is thus positioned laterally, and will be urged against the stops 118 when the pinch roller and drive roller 50 and 52 that drive the leading end of the carrier and engage the end of the substrate.

The leading end of the carrier is positioned about to enter the roller set 50 and 52, as previously described and because the pinch roller 52 will ride on the surface 115 initially, it will tend to slide the substrate 114 along the carrier when the leading end 114A is engaged by the pinch roller. Before the pinch roller lifts to engage the substrate it will tend to push the substrate back against the stops 118, to positively seat the substrate 114 in position for printing the same.

As illustrated in FIG. 19, the tray or carrier 17M can be made of a suitable plastic material, such as a polycarbonate, or other plastics that can be molded, and will have wall 120 with I shaped edge flanges 122 to provide some rigidity along the edges. the frame 56 supports wall 120 as shown, and the flanges 122 fit outside of the arm 58 as shown schematically. The platen roller and the drive rollers fit up against the wall 120. The carrier 17M is sufficiently flexible so that slight irregularities would not cause gaps in the printing. The force from platen 15 makes the carrier wall 120 conform to slight irregularities because of the resilient platen roller and the spring mounting, and the flexibility in transverse direction of wall 120.

Various other types of carriers 17M can be advanced, but the carrier is generally planar so that it can be driven by a drive roller on one side and a pinch roller on the other side, or some other type of reaction member such as the fixed printhead, for moving it through the printer.

FIG. 20 illustrates a further modified carrier 17N, which has an irregularly shaped substrate 130 mounted thereon using suitable side guides 132, and at least one trailing end guide 134. The carrier 17N would be made as previously shown, except it has a wall 135 that has grooves 137 extending in longitudinal direction to provide lateral flexibility for bending or conforming to lateral irregularities, and the guide and pinch rollers would exert a force as indicated by the arrow 136 to seat the substrate against the rear guide 134.

Figure 22:
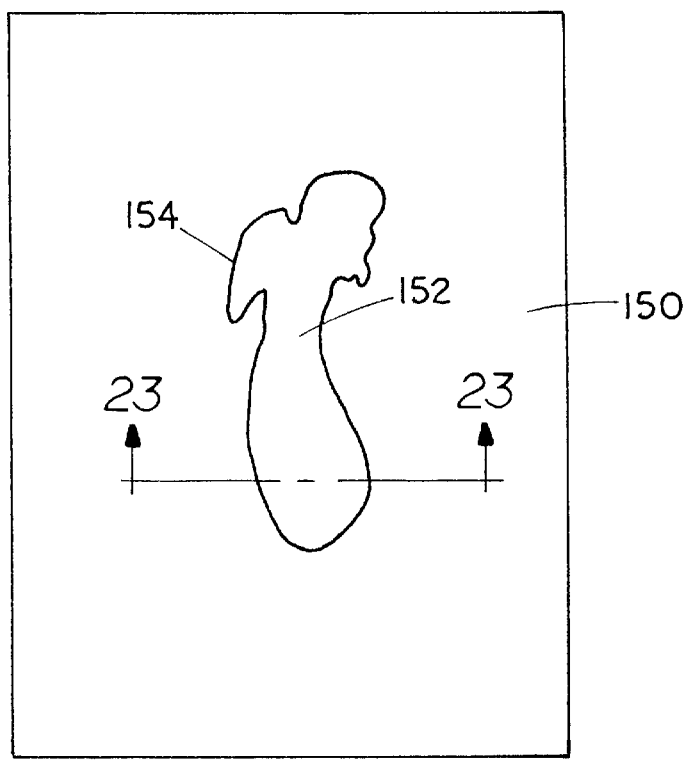
FIG. 22 is a top view of a tray or carrier with a recess for holding a substrate.
Figure 23:
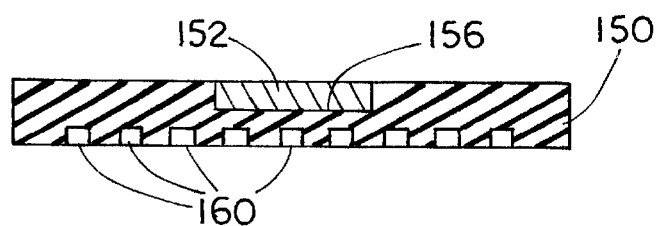
FIG. 23 is a sectional view taken on line 23—23 in FIG. 22.

FIGS. 22 and 23 show a modified planar carrier or tray 150 made for carrying a recessed substrate such as a name tag or card 152 to be printed upon that is fed between the drive and pinch rollers 50 and 52. The flat carrier 150, and an irregular shaped substrate 152, which as shown is a representation of Lake Michigan can be used for an identification badge or card for convention delegates.

The planar carrier or tray is of sufficient thickness so that the defining line 154 of the badge or substrate 152 can be milled as a recess 156 in the carrier or tray 150. The substrate recess 156 is milled to leave a thickness of material of the carrier below the recess. The badge 152 can be cut out as separate items. The cut peripheral edge of the badge will fit within the defining line 154 on the carrier 150, and fit down into the recess.

The planar carrier 150 can be made of two flat panels, including a base panel and an upper panel with the upper panel cut to form an opening of the shape desired. The opening could be closed on its bottom by bonding the base panel to the panel with the cut out.

The badges are held and located properly in the recess formed in the carrier. The carrier can have longitudinal grooves 160 to permit more lateral flexibility. The cutting of recesses of irregular shapes, or even rectangular shapes or ornamental designs, in the surface of a carrier or tray used with a printer increase the versatility of the printer.

It also can be seen in FIGS. 6A and 12 that electrical connections for the motors on the printhead cartridge assembly can be made with the connector shown at 90, which includes a portion 90A on the housing 30, and a second portion 90B on the printhead cartridge 36. When the printhead cartridge 36 moves to its home position, as latched with the receptacle 42, connection will be made for the power.

The controller shown at 96 will coordinate all functions, including the movement of the cam shaft 66 and the platen roller 15, through the stepper motors 66A and 15A, and the position of cam shaft 66 can be changed so that the cam rollers 68 will move to lower the platen 15 as needed. The printing can be preprogrammed into the controller.

The term substrate is intended to include objects that have a surface which is to have printed material applied and which will fit onto a carrier or tray. In addition to the items previously described, the term substrate can include credit cards, playing cards, labels, name tags, sign of various types and similar flat surface objects.

Although the present invention has been described with reference to preferred embodiments, workers skilled in the art will recognize that changes may be made in form and detail without departing from the spirit and scope of the invention.

What is claimed is:

1. A printer for printing onto a substrate comprising a housing, a printhead mounted in said housing and secured in a reference position, a generally planar carrier for a substrate, a platen to urge the carrier toward the printhead, a pivoting frame mounted on the housing, the platen being mounted on the pivoting frame, the pivoting frame having a surface supporting the carrier, a drive for said carrier to move said carrier along the surface in a plane relative to said printhead, the drive comprising a drive roller on one side of the carrier and a reaction member on an opposite side of the carrier, the drive roller engaging the carrier for directly driving and moving the carrier relative to the printhead.

2. The printer of claim 1, wherein the printhead is a thermal dye sublimation printhead having a plurality of heat elements for engaging a ribbon to transfer printing onto the substrate.

3. The printer of claim 1, further comprising a substrate on the carrier and moved with the carrier.

4. The printer of claim 3, wherein said substrate is selected from one of an identification card, a compact disc, a recordable compact disc and a digital video disc.

5. The printer of claim 1, wherein the position of the pivoting frame is controlled by a cam rotatable relative to the printhead that controls a force on the platen against the printhead.

6. The printer of claim 5, wherein said cam has a position that permits the platen and carrier to be lowered and spaced from the printhead for moving the ribbon, and a motor drive for moving the ribbon relative to the printhead when the platen is moved to a position to place the carrier spaced from the printhead.

7. A printer for printing onto a substrate comprising a housing, a printhead mounted in said housing and secured in a reference position, a generally planar carrier for a substrate, a drive for said carrier to move said carrier in a plane relative to said printhead, the drive comprising a drive roller on one side of the carrier and a reaction member on an opposite side of the carrier, the drive roller engaging the carrier for directly driving and moving the carrier relative to the printhead, a separate cartridge mounting the printhead, said cartridge being slidably removable from said housing, a latch for securing the cartridge on the housing with the printhead in the reference position, a ribbon carrying dye sublimation materials, said ribbon being provided on a supply roll, a take-up roll for receiving ribbon which has been used for printing, the supply and take-up rolls being mounted on said cartridge, such that the printhead and supply and take-up rolls are removable as a unit from said housing for loading said ribbon, said cartridge having a lower side, the printhead having a printing portion open to the lower side, and supports for said supply and take-up rolls accessible from the lower side for inserting the supply and takeup rollers and positioning said ribbon across the printhead when the cartridge is removed from the housing.

8. The printer of claim 7, wherein said housing has a first electrical connector mounted thereon, a mating electrical connector mounted on said cartridge, and said first electrical connector on the housing and said mating electrical connector engaging and making electrical contact when the cartridge is latched in the housing.

9. A thermal transfer printer for printing on substrates comprising a housing, a cartridge removably mounted in said housing and securable in a working position, a printhead mounted on said cartridge, a ribbon supply mounted on said cartridge for providing a ribbon movable relative to a portion of the printhead, and exposed at one surface of the cartridge, a platen mounted in said housing, a movable generally planar carrier for supporting a substrate to be printed and movable between a loading position and a printing position, and a friction drive roller for frictionally engaging the carrier under a resilient force between the drive roller and the carrier, the carrier being removable from the friction drive and the housing.

10. The printer of claim 9, wherein the friction drive roller is mounted onto a pivoting frame, and is positioned against an inlet end of the housing, a support for the pivoting frame, said support including a member engaged by the cartridge as the cartridge is moved to be secured in a working position to move the pivoting frame to a loading position wherein the drive roller will receive a carrier through the inlet end of the housing, and the frame moving to a retracted position when the cartridge is removed from the housing.

11. The printer of claim 10 wherein the platen is mounted on the frame, and an actuator for pivotally moving the frame to move the platen toward and away from the printhead, said actuator comprising a plate pivotally mounted about the same pivot axis as the frame, a cam acting on said plate to pivot the plate about its axis, a spring between the plate and the frame for exerting a resilient force on the frame tending to lift the frame to cause the platen to provide force created by the printhead when the cam is in the selected position, and to permit the platen to be moved to be spaced from the printhead in a second cam position.

12. The printer of claim 9, wherein the resilient force between the drive roller and the carrier is exerted by a pinch roller mounted on an opposite side of the carrier from the drive roller.

13. The printer of claim 9, wherein said resilient force between the drive roller and the carrier is provided by a spring loading of the platen toward the printhead, the printhead providing a reaction for the resilient force as the carrier is moved against the printhead.

14. The printer of claim 9, wherein said drive roller is positioned adjacent an inlet end of said housing, and the resilient force is provided by a pinch roller resiliently mounted to exert a pressure on a side of the carrier opposite from the drive roller, said pinch roller engaging a leading end of a substrate mounted on said carrier and urging the substrate against a stop provided on the carrier at a trailing end thereof.

15. In a printer having a printhead for printing onto a substrate, the improvement comprising a carrier for the substrate forming a generally planar member having a surface for supporting the substrate, a friction drive for the carrier for receiving the carrier at an inlet end of the printer and providing a drive throughout the printing operation only by friction acting directly on the carrier, the carrier having ribs along opposite side edges of the carrier that project from the plane of the carrier, and the carrier being removable from the printer.

16. The improvement of claim 15 and abutments on the carrier for providing positioning stops for the substrate.

17. The improvement of claim 15 wherein the carrier is planar and has a plurality of grooves formed partially through the carrier and the grooves extending in the direction of movement of the carrier through the printer.

18. The improvement of claim 15 wherein the carrier forms a planar plate having at least a groove in one of the surfaces to reduce lateral bending stiffness.

19. The improvement of claim 15 further comprising ribs along opposite side edges of the carrier that project from the plane of the carrier.

20. In a printer having a printhead for printing onto a substrate, the improvement comprising a carrier for the substrate forming a generally planar member having a surface supporting the substrate, a friction drive for the carrier for receiving the carrier at an inlet end of the printer and providing a drive throughout the printing operation only by friction acting directly on the carrier, said carrier is being made of a conformable material to permit flexing in a transverse direction, and the carrier being removable from the printer.

21. In a printer having a printhead for printing onto a substrate, the improvement comprising a carrier for the substrate forming a generally planar member having a surface supporting the substrate, a friction drive for the carrier for receiving the carrier at an inlet end of the printer and providing a drive throughout the printing operation only by friction acting directly on the carrier, said friction drive comprising a plurality of drive rollers spaced longitudinally along the printer, the drive rollers engaging a first surface of the carrier sequentially, and the carrier being resiliently held between the drive rollers and reaction members for creating a friction drive force on the carrier.

22. In a printer having a printhead for printing onto a substrate, the improvement comprising a carrier for the substrate forming a generally planar member having a surface supporting the substrate, a substrate recess formed in the surface, said substrate recess being cut into an irregular peripheral shape, a friction drive for the carrier for receiving the carrier at an inlet end of the printer and providing a drive throughout the printing operation only by friction acting directly on the carrier, the carrier being removable from the printer.

23. The improvement of claim 22, wherein said carrier is a homogenous material throughout its thickness, and the recess is cut partially through the thickness of the carrier with a desired outer peripheral configuration.

* * * * *